United States Patent [19]

Yoshioka et al.

[11] 4,088,578
[45] May 9, 1978

[54] PROCESS AND APPARATUS FOR SEPARATING OIL FROM WATER CONTAMINATED WITH OIL

[75] Inventors: Teruo Yoshioka, Funabashi; Shinichi Iwanami, Tokyo, both of Japan

[73] Assignee: Fujisash Industries, Ltd., Kawasaki, Japan

[21] Appl. No.: 663,803

[22] Filed: Aug. 4, 1976

[30] Foreign Application Priority Data

| Mar. 7, 1975 | Japan | 50-27070 |
| Mar. 10, 1975 | Japan | 50-27961 |
| Apr. 3, 1975 | Japan | 50-4417[U] |

[51] Int. Cl.² ........................................... B01D 21/02
[52] U.S. Cl. .................... 210/73 W; 210/83; 210/121; 210/295; 210/323 R; 210/416 R; 210/532 R; 210/540; 210/DIG. 26

[58] Field of Search ............. 210/83, 121, 73 W, 322, 210/323 R, 437, 513, 532 A, 538, 540, DIG. 25, DIG. 26, 416 R, 295

[56] References Cited

U.S. PATENT DOCUMENTS

| B 401,221 | 4/1976 | Tuttle ............................ 210/540 X |
| 2,658,622 | 11/1953 | Thornhill ........................... 210/437 |
| 3,836,000 | 12/1974 | Jakubek .................... 210/DIG. 26 X |
| 3,849,311 | 11/1974 | Jakubek ............................ 210/188 |
| 3,852,193 | 12/1974 | Jakubek et al. ......... 210/DIG. 26 X |

*Primary Examiner*—William A. Cuchlinski, Jr.
*Attorney, Agent, or Firm*—Staas & Halsey

[57] ABSTRACT

Water contaminated with oil is separated within a closed container into an oil layer and a water layer containing a residue of oil, because of the difference in the specific gravities of water and oil. A suction pump sucks the separated oil from the container to reduce the pressure of the liquid in the container, thereby lowering the concentration of oil residue in the separated water.

25 Claims, 5 Drawing Figures

PROCESS AND APPARATUS FOR SEPARATING OIL FROM WATER CONTAMINATED WITH OIL

The present invention relates to a process for separating oil or the like from water which is contaminated with oil or the like, particularly bilge water of ships, and to an apparatus for carrying out the process, particularly an apparatus suited for mounting on a ship.

In the conventional process for separating oil and water, it is well known to suck up dirty water contaminated with oil by a pump and eject the dirty water into a closed separation container, thereby causing an increase in the pressure of the liquid in the separation container. It is also known to discharge separated oil from the separation container by means of the pressure resulting from oil contaminated water being pumped the container. In this case the container is required to be pressure tight and, hence, the size of the entire separating apparatus is quite large.

It is also known to make use of the head drop, i.e. the altitude difference between the surface level of the separated oil and an outlet tube for the separated oil, is to discharge the separated oil through the outlet tube, which is provided with a closable valve. In this case, since the head drop should be as large as possible, the height of the separation container becomes large. In addition, when the separated oil is highly viscous, the outlet tube must have an extremely large diameter and, as a result, the size of the entire separating apparatus is large. An outlet tube of a small diameter not only makes it difficult to discharge highly viscous oil, but also causes an increase in pressure within the separation container during operation. As a result of the increase in pressure, the operation of devices used in the container becomes faulty.

Prior art includes U.S. Pat. Nos. 3,836,000 and 3,849,311.

It is an object of the present invention to provide a process for separating oil or the like from water which is contaminated with oil or the like, particularly bilge water of ships, which process enables effective and reliable separation.

It is another object of the present invention to provide an apparatus for separating oil or the like from water which is contaminated with oil or the like, particularly bilge water in ships, which apparatus is of a small size suitable for mounting on a ship, particularly a small ship of less than 300 tons.

It is still another object of the present invention to provide an apparatus for separating oil which operates reliably when treating contaminated water, such as bilge water, which includes foreign matter such as dust and sludge. The phrase "water contaminated with oil" as used herein indicates water containing oil, which is dispersed in and/or floating on the surface of the water, and particularly bilge water.

The above objects are accomplished according to the present invention in the following manner. The water contaminated with oil is pumped from a pool thereof, such as a pool of bilge water, into a closed vessel for separation of the oil and the water due to the floating of the former on the latter because of their different specific gravities. Water particles of the bilge water sink through a liquid phase containing a large amount of oil particles toward the bottom of the vessel. The water layer thus separated contains at the upper part thereof a small amount of oil particles, i.e. oil particles to be separated at a later time. The middle and lower parts of the separated water layer contain considerably smaller amounts of oil particles than the upper part and, therefore, are essentially free of oil. The separated water layer, including the above mentioned upper, middle and lower parts, is hereinafter referred to as the underlying layer. The middle and lower part of the underlying layer, i.e. separated water layer are, hereinafter, referred to as the purified water layer. The separated oil contains a trace amount of water, but the majority of the water sinks and becomes the underlying layer. The oil layer is, therefore, essentially free from water.

The height from the bottom of the vessel of the interface between the already separated oil layer and the underlying layer is measured by, for example, a densimetric float, so as to determine the relative amounts of the separated oil layer and the underlying layer. Either the oil in the separated oil layer or the water in the purified water layer is discharged from the container depending upon the determined relative amounts thereof. The separated oil is sucked through a conduit to discharge the separated oil and reduce the pressure of the liquid phases, i.e. the separated oil and water. The purified water is discharged through a conduit provided with a valve, preferably a non-return valve. The purified water is forced to flow through the conduit by the pressure of a stream of bilge water which flows into container.

Figure 1:
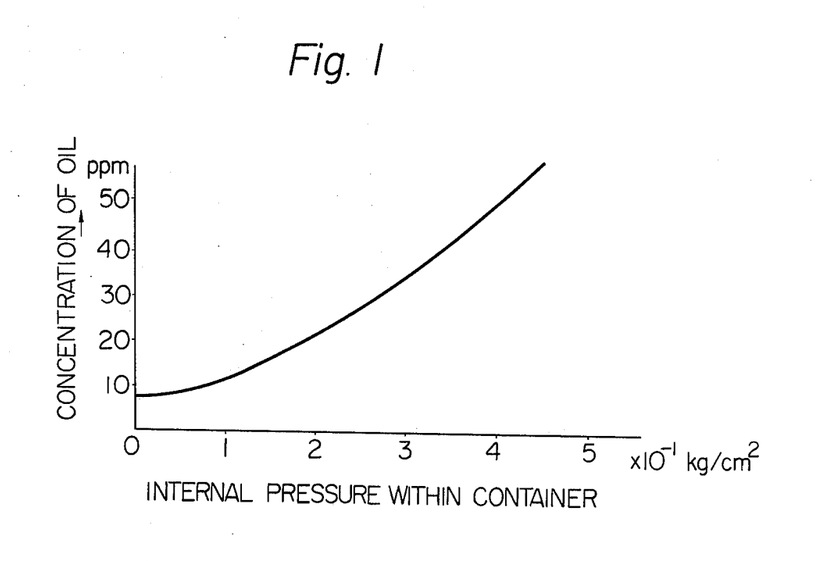

Through investigations of the separating of oil from water contaminated with oil in a closed container, the Inventors discovered a relationship between the pressure of the water contaminated with oil, which was varied under 0.45 kg/cm$^2$, and the concentration of oil in the purified water as illustrated in FIG. 1. As is understood from FIG. 1, the efficiency of separation is lowered with an increase in the pressure of the liquid phases in the container, i.e. the inner pressure of the container. Since the inner pressure of the liquid phases in the conventional method of separating oil from water can increase up to approximately 5 kg/cm$^2$, due to the ejection of bilge water from the pump supplying the same into the container, it is understood that the conventional method separates the bilge water under a disadvantageous condition. According to the present invention, the upper limit of the inner pressure should be 0.5 kg/cm$^2$, preferably 0.3 kg/cm$^2$. The lower limit of the inner pressure of the liquid phases being treated should be 0.05 kg/cm$^2$, preferably 0.1 kg/cm$^2$, from the point of view of avoiding a cavitation phenomena. The range of pressure, therefore, should be from approximately 0.05 to approximately 0.5 kg/cm$^2$, preferably from approximately 0.05 to approximately 0.3 kg/cm$^2$, and more preferably from approximately 0.1 to approximately 0.3 kg/cm$^2$.

The above mentioned process of the present invention, in which the separated oil is sucked through the conduit by a pump and the purified water is forced to flow out by the pressure of the water contaminated with oil being supplied by a supply pump, enables the separation of water contaminated with oil under reduced pressure only when the relative amount of the separated oil compared to the underlying layer exceeds a predetermined value. A large relative amount of separated oil occurs only when the proportion of oil in the bilge water supplied into the container is large and, hence, it is required to perform the separation under the condition of reduced internal pressure, at least during the period in which said relative amount is large. When the operation of the separation apparatus is initiated, the lower layer composed mainly of the water portion of a bilge water is supplied into the container and, hence, the suction pump for oil is stopped. In this case, although the inner pressure can increase up to 0.5-1 kg/cm², the increased pressure is not critical to the efficiency of the separation because of the low content of oil in the lower layer of the bilge water.

The process according to the present invention may also be characterized in that, depending upon the determined relative amounts of the separated oil layer and the underying layer, either the separated oil or the purified water is sucked by the respectively alloted pump so as to discharge the oil or water and to reduce the pressure of the liquid phases in the container. In this process, since the reduction of pressure is performed while either the separated oil or separated water is discharged, a condition favourable for separation is assured over the period of time the bilge water is treated.

The present invention is also characterized, by employing a suction pump for sucking the separated oil in a closed container, and reducing the pressure of the liquid phase in said container, and a float switch which operates the suction pump in dependency on the height from the bottom of the container of the interface between the separated oil layer and the underlying layer. Since the purified water is discharged by a suction pump, it is possible to avoid exerting an excessive pressure within the container when the suction pump is operated. Consequently, the container is neither required to be pressure resistant nor to be fitted with an outlet pipe of large diameter. The separation apparatus, therefore, can be small.

The above mentioned apparatus, in which the suction pump and the float switch is employed, usually comprises a closed container for separating the oil from the water by allowing the oil to float on the water, a first pump means for pumping the bilge water into the container from a pool of the bilge water, a supply conduit connected to the first pump means and the container, an oil drain conduit connected to the container, communicating with the separated oil and connected to the suction pump for oil, and a water drain conduit connected the container, communicating with the separated water and provided with a shut off means which is operated in dependency on the float switch means in the container. The first pump means is manually turned on and off, depending upon the level of bilge water which the operator observes with the naked eye. The apparatus further comprises a control switch means which operates the first pump means in dependency on the level of the liquid in the pool, when the automatic pumping of the bilge water should be performed.

In an embodiment of the separation apparatus, a filter packing is disposed in the container and spaced from the top of the container to form an inside top space for liquid. The filter packing removes foreign matter such as dust from the purified water. The filter preferably consists of foamed plastic material having pores which are connected to each other. The foamed material can collect small oil particles unable to float and permit them to grow into large sized particles. The large sized particles of oil float into the top space and are incorporated into the oil layer. The reduction in the internal pressure of the container, in which the filter packing is disposed, is provided by the suction pump for oil.

The present invention is also characterized by a suction pump for the purified water in addition to the above mentioned suction pump for the separated oil and the float switch means. The suction pump for the separated water is turned on by the float switch means when the pump for separated oil is turned off. Since the inner pressure within the container is reduced while either one of the two suction pumps is operated, the dimensions of the separation apparatus can be further reduced from those of the conventional apparatus.

In employing the two suction pumps for the separated water and oil, respectively, it is advisable to use the above mentioned container as a coarse separator and to further separate the oil in the purified water in a fine separator. The fine separator essentially consists of a closed container, in which the filter material is disposed and spaced from the top thereof to form a top space for liquid inside the container. The water drain conduit from the coarse separator is connected to the fine separator and a second water drain conduit, provided with a shut off means, is connected to the fine separator. In the fine separator, the fine particles of oil, which are contained in the coarsely purified water in a small proportion, are collected into coarse particles and float toward the top space.

The present invention is further characterized by a filter means for removing foreign matter, such as dust or solid components, in the bilge water to be separated into oil and water in the coarse separation container or a single separation container. The filter means is connected to the supply conduit of bilge water preferably between the pump and the container. The filter means comprises a casing provided with an inlet and an outlet on its wall, each communicating with the supply conduit. The casing is covered by a removable cover so as to allow exchange of the filter material as hereinafter illustrated. A tubular body provided with apertures on its wall is removably inserted into the casing. The filter material can, therefore, easily be exchanged by lifting up the tubular body. This body usually has a similar cross section to that of the casing and is usually positioned coaxially with the casing. Depending upon the relationship in size between the casing and the tubular body the tubular body is inserted into the casing either tightly or loosely. In the latter case a clearance can be formed between the casing and tubular body. In this case it is necessary to secure the tubular body to the casing by suitable means, such as bolts. The bilge water flowing into the casing through the inlet passes into the tubular body through several of the apertures, and in turn passes out of the tubular body through other apertures of the tubular body. In the case where a clearance is formed between the casing and the tubular body it is convenient to divide the clearance into two chambers by a partition, so that the bilge water flows through only one of the chambers into or out of the casing. It is convenient to connect the tubular body with the partition. The filter material is so located in the tubular body that the bilge water flowing through the tubular body passes through the filter material. The filter material preferably fills the entire volume of the casing. The filter material can be a foamed plastic material.

Due to the course filtering means of the present invention, it is possible to avoid the clogging of the packing filter in the coarse separation container or a single container. Clogging takes place due to foreign matter in the pool of bilge water, such as dust and solid components. It is, therefore, possible to prevent the arrival of foreign matter at the filter packing and to ensure long operation of the separation apparatus without interruption.

The present invention is still further characterized by employing a partition plate which divides the top space of the coarse container or a single container. The partition plate divides the top space of the container into a space in which the bilge water flows and another space in which the float of the float switch means are located to determine the height of the interface between the separated oil layer and the underlying layer.

The partition plate essentially consists of a flat region and another region inclined, or defected, from the former. The angle of deflection is such that the tangential planes of the deflected region intersect an imaginary plane extended from the flat region at angle of from 70° to 90°. Said deflected region can be straight or curved. Apertures are formed in the deflected region of the partition plate.

The partition plate is secured at the end of the above mentioned flat region to a part of the inner wall of the container, above the bilge water supplying conduit in the container, so that the flat region is situated substantially parallel to the axis of the bilge water supply conduit. The deflected region of the partition plate extends upwardly. The bilge water flowing through the supply conduit firstly flows horizontally along the lower plane of the flat region of the partition plate. The flow of bilge water is subsequently changed into a rising stream of separated oil, which climbs at an angle of from 70° to 90° with respect to the horizontal. The deflection of the flow at such angles greatly enhances the smooth floating of the oil particles, so that the bilge water can be rapidly separated. If the angle of deflection is below 70°, the oil particles cannot float smoothly. Contrary to this if the angle of deflection exceeds 90°, the fine particles of oil are inclined to stay under the flat region of the partition plate. Since the bilge water flows into the container below the partition plate, the flowing movement of the bilge water is not transmitted into the space over the partition plate. It is, therefore, advisable to install the float of the float switch means, such as a densimetric float, in the space which is defined by the upper surface of the partition plate and the inner wall of the container on which the end of the partition plate is secured. In this way it is possible to prevent errorneous measurement by the float due to the adhesion of impurities, such as sludge, on the float of the float switch means.

The rising stream of oil, which moves along the deflected parts of the partition plate, contains a trace amount of water. The oil particles and a trace amount of water particles advance into the space defined by both the upper surface of the partition plate and the inner wall of the container, through the apertures provided in the deflection plate, and are divided into an oil layer and a water layer in the space defined as stated above. The height of the interface between these layers is measured by the float.

In an embodiment of the partition plate, the flat region of the partition plate is provided with one or more conduits communicating the spaces over and under the flat region. A water layer which is separated in the space over the partition plate, is rapidly discharged through the conduits, because an oil stream advancing into the space over the partition plate exerts pressure on the separated water. It is preferable to extend the lower end of the conduits to the region of the filter packing.

The invention will now be explained more fully with reference to FIGS. 2 through 5 of the accompanying drawings, which illustrate several preferable embodiments of the apparatus according to the present invention. In these figures.

Figure 2:
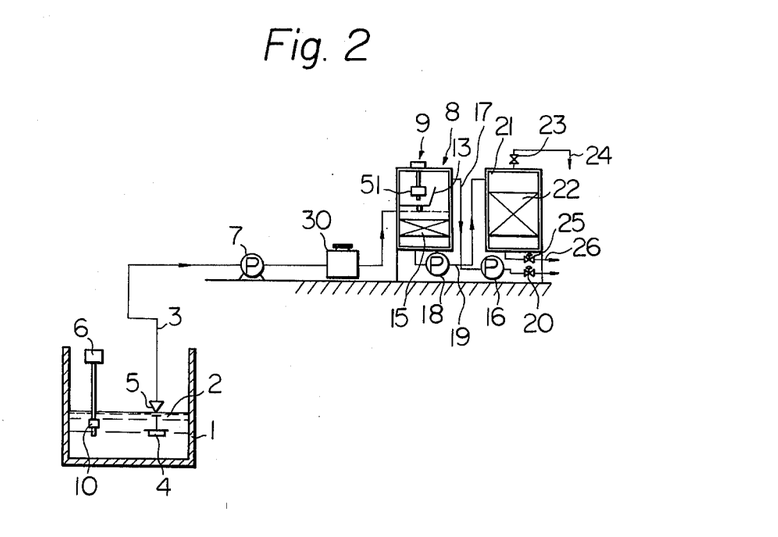
FIG. 2 schematically shows the preferable embodiment of the apparatus according to the invention.

The apparatus according to the invention illustrated in FIG. 2 comprises a first pump 7 for sucking bilge water 2 and supplying it into a container 8, which is a coarse separator. The bilge water 2 in the form of a pool is found in the bottom of a ship 1. A control switch 6 is in depending on the level of the liquid in the ship, which is determined by a densimetric float 10, and is electrically connected with the supply pump 7. When the amount of bilge water 2 reaches a predetermined value, the pump 7 is energized by the switch 6 and commences the suction of the bilge water 2 through a mouth 4 via a supply conduit 3. The switch 6 automatically denergizes the pump 7 when the level of the bilge water is reduced to a predetermined value.

The bilge water is supplied through the dust collector 30, which coarsely filters the bilge water, and then into the first closed container 8. This includes a densimetric float, for measuring the level of the interface between the separated oil layer and the underlying layer, a partition plate 13 and a filter packing 15.

The bilge water flows into the container 8, at a point which is located at almost half the height of the container. The bilge water supplied into the container 8 at the beginning of the operation contains almost no oil. The concentration of oil in the supplied bilge water increases with duration of operation. The bilge water is separated in the container 8 into a water layer and an oil layer, due to the floatation of oil particles. Fine particles of oil unable to float sink together with sinking particles of water and then are permitted to grow into coarse particles by the filter packing 15 schematically designated in the figure.

An oil drain conduit 17 is connected to the upper part of the container 8 and is fitted with an oil suction pump 16 and a magnetic valve 20, both being electrically connected to a float switch means 9. A water drain conduit 19 is connected to the bottom of the container 8 and is fitted with a water suction pump 18, which is electrically connected to the float switch means 9. Depending upon the level of the interface measured by the float 51 of the float switch means, which detects whether the interface between the oil layer and the underlying layer exceeds or decreases from the predetermined level, either the pump 16 or the pump 18 is operated. Namely, the pump 16 discharges the oil or the pump 18 discharges the water. Either the water or the oil is greater than the predetermined value at any time, and is discharged as stated above. The suction pumps for oil 16 and water 18 may be stopped for a short time sufficient to avoid increasing the internal pressure over the preferably 0.1 kg/cm². When the one of the suction pumps 16 or 18 is operated, the other must not be operated, although both pumps can be stopped for a very short time as stated above. When the operation of suction pump for oil 16 is terminated, the valve 20 is electrically closed.

The coarse separator 8 is operated under such condition that the liquid phases fill the entire inner space of the container 8. The pressure of the liquid phases is, therefore, equal to the value of the supplying pressure of bilge water minus the suction pressure.

The water drain conduit 19 is connected to the upper part of a second container 21, which is the fine separator. The second container 21 contains a filter packing 22, which is disposed therein so as to leave a top space for liquid. A conduit 24 provided with an air venting valve 23 exits from the cover of the second container 21. A conduit 26 for draining finally purified water is connected to the bottom of the container and is fitted with a magnetic valve 25. The oil particles are finally removed from the purified water in said second container, because the oil particles are adsorbed by the filter material 22 and, further, the adsorbed oil particles gradually grow to coarse particles. These coarse particles float upwardly and accumulate on the surface of the liquid which fills the second container. The accumulated oil particles are removed through the conduit 24 provided with the valve 23.

The air in the second container 21 is rapidly decreased with the influx of purified water through the conduit 19. To vent the air from the second container 21 at very beginning of the separating operation, an air-venting valve 23 is provided at the top of the container 21. The second container 21 can, therefore, be operated under an air-free condition.

Figure 3:
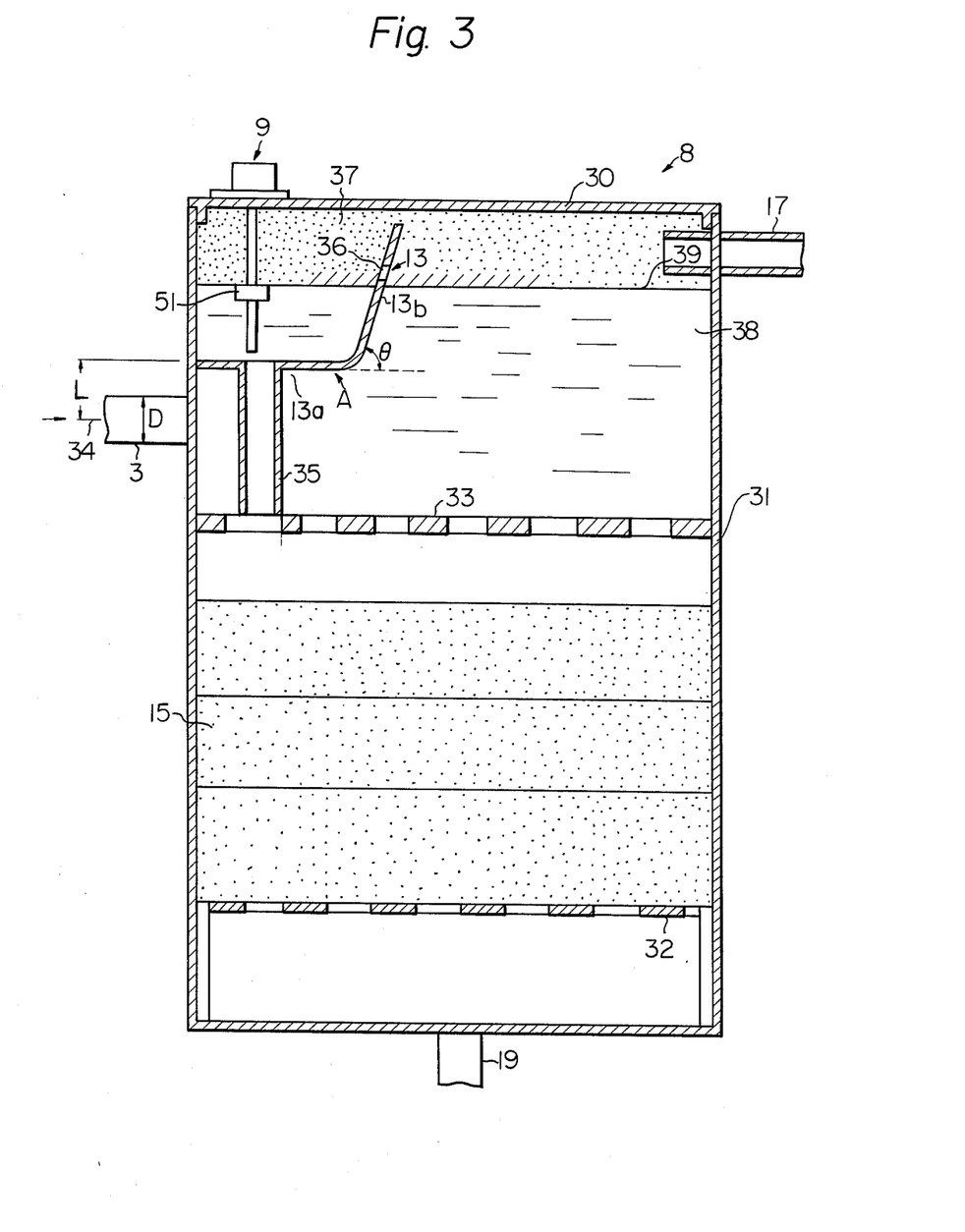
FIG. 3 shows a cross sectional view of the preferable embodiment of the container for oil separation with a partition plate according to the present invention.

In FIG. 3, an embodiment of the first container 8 is illustrated in an enlarged, cross sectional view. The first container 8 consists of a removable cover 30 and a housing 31, which contains a foam filter 15 resting on a supporting plate 32 which has a plurality of apertures. The supply conduit 3 is horizontally connected with the sidewall of the container 31. The plate with apertures 33, is secured horizontally on the sidewall of the container below the height of the supply conduit 3. The filter material 15 is located below the plate with apertures 33 in such a manner that a space is left between said plate and said filter material. The plate with aperture 33 may be a screen or a perforated plate. The oil drain conduit 17 exits horizontally at a level higher than the supply conduit 3.

The partition plate 13 is secured to the container at the end of the flat region 13a thereof. The distance L from the secured end of the flat region 13a to the central axis 34 of the supply conduit 3 should be approximately equal to 3D, wherein D is the inner diameter of the supply conduit 3. The angle of intersection $\theta$ between a hypothetical extension of the flat region 13a and the inclined region 13b should be from 70° to 90°, preferably 70° to 80°. The partition plate 13 in FIG. 3 has a rounded corner, which may be formed by an usual method for manufacturing the partition plate. The length of region 13a should preferably be from equal to two times the length of region 13b. The length of region 13a should preferably be from 3.5D to 4D.

The width W of the partition plate 13 (FIG. 4) should be slightly less than the width of the container 8 in a case where the shape of the container is a rectangular pipe, so that the partition plate 13 can easily be installed in and removed from the container 8, and; further, so that the float 51 can be almost completely isolated from the influx of bilge water. In a case where the container 8 is cylindrical, the partition plate 13 should be installed in the container 8 in such a manner that the ends 13c, 13d of the plate are close to the inner wall of the container. The region 13a of the partition plate 13 is fitted with two conduits 35, which are substantially vertically extended to the level of the plate 33 with apertures.

Figure 4:
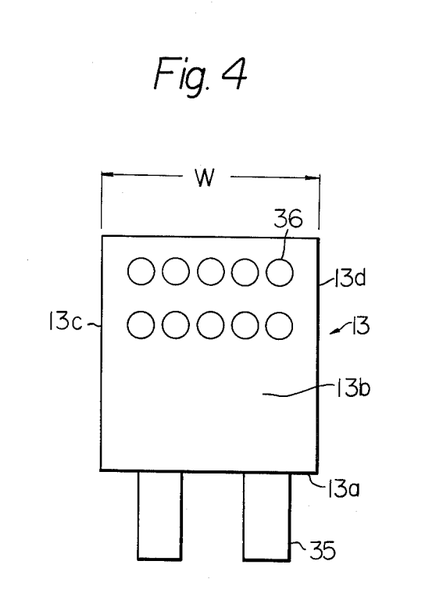
FIG. 4 shows the partition plate used in the apparatus of FIG. 3.

As seen in FIG. 3 and FIG. 4, the inclined region 13b of the partition plate 13 is provided with apertures 36. These apertures are provided on the upper part of the inclined region 13b in FIGS. 3 and 4. Said upper part should preferably be the upper half the region 13b.

In the embodiment illustrated in FIGS. 3 and 4, the bilge water introduced through the conduit 3 is coarsely separated in the space above the perforated plate 33. Due to the deflection of the stream of bilge water by the partition plate 13, the separation is accelerated. A part of the separated oil particles advances into a space which is defined by the upper surface of the plate 13. The float 9 for measuring the level of the interface between the separated oil layer 37 and the underlying layer 38, and operating either the suction pump for water or the suction pumps for oil, is isolated from the action of bilge water, which flows through the conduit 3. This is because the float 9 is isolated by the partition 13 from the space in which the bilge water flows. The water of the underlying layer 38 passes through the apertures 36 of the partition plate into the space defined by the upper surface of the partition plate 13 and the inner wall of the container 8, when the level of the underlying layer 38 is above the level of the apertures 36. When the level of the underlying layer 38 is below the level of the apertures 36, a small amount of water accompanying a rising stream of oil particles advances into the above mentioned space together with the oil particles. Said small amount of water is then separated from the oil particles and incorporated into the underlying layer 38. Both said small amount of water and the water of the underlying layer are forced to flow from the above mentioned space through conduits 35, because the oil particles successively introduced through the apertures 36 exert a pressure on the water layer. The float 9 can, therefore, accurately determine the level of the interface 39. The separated water discharged through the conduits 35 is directly fed into the proximity of the filter packing 15, where further separation takes place by means of the filter material. Since the separated water is directly fed into the proximity of the filter packing, the separated water is neither forced to float by the rising stream of oil particles nor discharged together with the separated oil.

Figure 5:
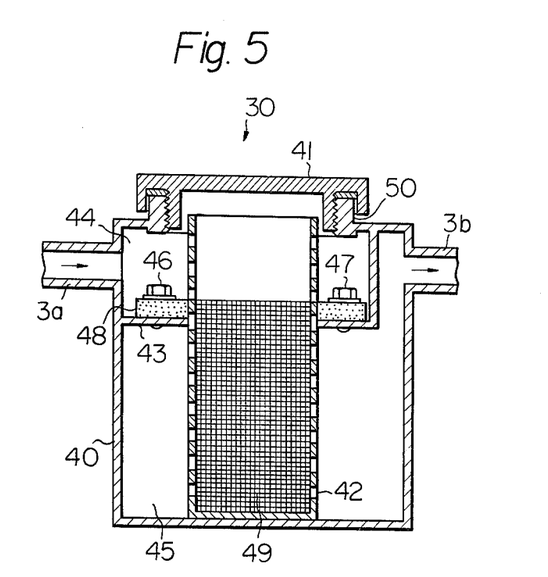
FIG. 5 shows a cross sectional view of a preferable embodiment of the coarse filtering means of the present invention.

An embodiment of the coarse filtering means 30, illustrated in FIG. 1 and in detail in FIG. 5, comprises a casing 40 and a removable cover 41. The casing is provided on its upper part with an inlet and an outlet, at the same level, communicated with supply conduits 3a and 3b, respectively. Bilge water flows in the direction of the arrow through the inlet. A lug 50 in the form of a ring is formed on the upper part of the casing 40 and a screw thread is provided on the inner surface of the lug. The cover 41 is secured to the casing 40 by the screw thread.

A tubular body 42, for example a perforated tube or screen in the form of tube, having apertures and being substantially the same height as the casing 40, is removably inserted into the casing 40. The casing 40 and the tubular body 42 have symmetrical cross sections and are coaxial to each other. The tubular body 42 is used to support a filter material illustrated hereinafter. The tubular body, thereafore, should be provided with apertures, each of which is large enough to pass the foreign matter in the untreated bilge water thereinto.

The casing 40 is fitted with an inner partition wall 43, which divides the space in the casing 40 into a first chamber 44 and a second chamber 45, when the tubular body 42 is inserted and locked by bolts 46 and 47 to the inner partition wall 43 through foamed urethane 48 in the form of a ring. The bilge water firstly flows into the first chamber 44 and then into the tubular body 42 through several of the apertures of the tubular body 42. The bilge water, which is then free from foreign matter, flows through other apertures of the tubular body 42 into the second chamber 45. Since this second chamber 45 encircles the tubular body 42 and is isolated from the first chamber 44 by the partition wall 43, the foreign matter in the bilge water does not arrive at the second chamber 45.

The tubular body 42 should preferably be lined on its inner wall below the foamed urethane 48 with a screen 49. Even if the filter lets the foreign matter escape, the foreign matter can be captured by the screen. The screen 49 should be of approximately 100 mesh, in a case where the bilge water is treated in the coarse filter.

The filter material (not illustrated in FIG. 5) is disposed within the screen 49, up to the height of the screen 49. The filter material can be a foamed plastic material, such as foamed urethane with pores which are connected to each other. The three dimensional shape of the filter material may be cylindrical or cylindrical with a short central recessed area. The bilge water flows through the body of filter material, for example, through the short central recessed area and the surrounding part of the filter material, or the cylindrical solid body. The bilge water flows through the filter material so that the liquid which leaves the coarse filtering means 30 is free from foreign matter. When the filter material cannot be used due to its being worn out, the removable cover 41 is unlocked and the tubular body 42 is lifted up together with the filter material, which can then easily be exchanged for fresh filter material.

Although one embodiment of the coarse filtering means is illustrated above, the coarse filtering means is not limited thereto and thus can be embodied as follows. The inlet 3a and the outlet 3b may be located on different levels from each other or on the middle or lower part of the casing 40. The inner partition wall 43 may have any shape which divides the inner space of the casing 40 into one chamber including the inlet 3a and another chamber including the outlet 3b. The screen 49 may be omitted depending upon the kinds of filter material and the water contaminated with oil to be treated. The filter material may be disposed within the tubular body in a manner such that the upper end of the filter material is situated higher than the screen 49.

The invention is further illustrated by way of the following Example, wherein the separation apparatus schematically illustrated in FIG. 1 is operated to separate oil from bilge water.

EXAMPLE

The bilge water to be treated contained 30% by volume of oil and exhibited a viscosity of 133.5 cst at 50° C. The overall dimensions of the apparatus were 300mm × 350mm × 700mm, or from almost one half to two thirds those of the conventional separation apparatus. The bilge water was supplied into the coarse separator at a rate of 2.5 l/min. The oil was floated and the fine particles of oil accompanied by sinking water grew to coarse particles due to the foamed poly urethane having pores which were connected to each other. The pump 16 for separated oil and the pump 18 for coarsely purified water were alternately operated, thereby maintaining the inner pressure in the coarse separator within a range of 0.05 to 0.1 kg/cm$^2$. The coarsely purified water was finally purified in a fine separator containing foamed urethane having pores which were connected to each other. The concentration of oil in the finally purified water was lower than 15 ppm. 36,000l of the bilge water could be treated in 240 hours.

Although the invention has been described in its several preferable embodiments, it is to be understood that the present invention may be embodied in various forms without departing from the scope of the invention as hereinafter claimed.

What we claim is:

1. A process for separating oil from water contaminated with oil, comprising the steps of:
    pumping the water contaminated with oil into a closed container, in which the oil floats as a separated oil layer and the water sinks as an underlying layer containing a purified water layer;
    measuring the level of the interface between the oil layer and the underlying layer to thereby determine the relative amounts of the separated oil layer and the underlying layer;
    depending upon the determined relative amounts, discharging either the separated oil or purified water from the container through a conduit for oil or a conduit for water, in such a manner that the separated oil is sucked through the conduit for oil so as to reduce the pressure of the liquid phases in said container and the purified water is forced to flow through the conduit for water by the pressure of said water contaiminated with oil being supplied into said container;
    said discharging of either the separated oil or purified water being performed in an air-free condition in the container;
    said pumping of the water contaminated with oil into said closed container being continued during said discharging of either the separated oil or purified water wherein the pressure of the liquid phases in said container is reduced to a value of from approximately 0.05 kg/cm$^2$ to approximately 0.5 kg/cm$^2$, while said separated oil is being sucked.

2. A process according to claim 1, wherein the pressure of the liquid phases is reduced to a value of from approximately by 0.05 kg/cm$^2$ to approximately 0.3 kg/cm$^2$.

3. A process for separating oil from water contaminated with oil, comprising the steps of:
    continuously pumping the water contaminated with oil into a closed air-free container, in which the oil floats as a separated oil layer and the water sinks as an underlying layer containing a purified water layer;
    measuring the level of the interface between the oil layer and the underlying layer to thereby determine the relative amounts of the separated oil layer and the underlying layer;
    depending upon the determined relative amounts, sucking and discharging either the separated oil or the purified water through a conduit for oil or a conduit for water, thereby reducing the pressure of the liquid phases in said container; and, wherein the pressure of the liquid phases in said container is reduced to a value of from approximately 0.05 kg/cm$^2$ to approximately 0.5 kg/cm$^2$, while either said separated oil or purified water is being sucked.

4. A process according to claim 3, wherein the pressure of the liquid phases is reduced to a value of from approximately 0.05 kg/cm$^2$ to approximately 0.3 kg/cm$^2$.

5. An apparatus for separating oil from water which is contaminated with the oil, comprising:
- a closed air-free container for separating the oil from the water by allowing the oil to float up and the water to sink down so as to form a separated oil layer and an underlying layer which includes a purified water layer;
- means for effecting the pressure of the liquid phases in said container to a value from approximately 0.05 kg/cm$^2$ to approximately 0.5 kg/cm$^2$ including,
- a first continuously pump means for pumping said water contaminated with oil from a pool thereof to said container;
- a control switch means for operating said first pump means in dependency on the level of the liquid in said pool;
- a supply conduit entering said pool and connected to said container and said first pump means;
- a water drain conduit connected to said container, communicating with the purified water and provided with a shut off means;
- a second pump means for sucking said separated oil through an oil drain conduit defined below this pump means and reducing the pressure of the air-free liquid phases in said container;
- an oil drain conduit connected to said container, communicating with the separated oil in said container and connected to said second pump means, and;
- a float switch means in dependency on the level of the interface between the separated oil layer and the underlying layer and either operating said second pump means or opening said shut off means.

6. An apparatus according to claim 5, wherein a filter packing is disposed in said container and is spaced from the top of the container so as to form inside the container a top space for liquid.

7. An apparatus according to claim 6, further comprising:
- a coarse filtering means, for preventing the clogging of the filter packing in said container by dust and solid components in said pool, connected to said supply conduits, the coarse filtering means comprising a casing provided with an inlet and an outlet communicated with said supply conduit, a removable cover, a tubular body removably inserted into said casing, which body includes a filter material therein and is provided with apertures on its wall, whereby the water contaminated with oil flows into the tubular body through several of the aperatures thereof, passes through the filter material and flows out of the tubular body through other of the apertures thereof.

8. An apparatus according to claim 7, wherein said filter material is of foamed-plastic.

9. An apparatus for separating oil from water which is contaminated with the oil, comprising:
- a closed air-free container for separating the oil from the water by allowing the oil to float up and the water to sink down so as to form a separated oil layer and an underlying layer which includes a purified water layer;
- means for effecting the pressure of the liquid phases in said container to a value from approximately 0.05 kg/cm$^2$ to approximately 0.5 kg/cm$^2$ including;
- a first pump means for continuously pumping out said water contaminated with oil from a pool thereof to said container;
- a control switch means for operating said first pump means in dependency on the level of the liquid in said pool;
- a supply conduit entering said pool, and connected to said container and said first pump means;
- a second pump means for sucking said separated oil through an oil drain conduit defined below this pump means and reducing the pressure of the air-free liquid phases in said container;
- an oil drain conduit connected to said container, communicating with the separated oil in said container and connected to said second pump means;
- a third pump means for sucking said purified water through a water drain conduit defined below this pump means and reducing the pressure of the liquid phases in said container;
- a water drain conduit connected to said container, communicating with the separated water and connected to said third pump means, and;
- a float switch means in dependency on the level of the interface between the separated oil layer and the underlying layer and operating either said second pump means or said third pump means.

10. An apparatus according to claim 9, wherein a filter packing is disposed in said container and is spaced from the top of the container so as to form inside the container a top space for liquid.

11. An apparatus according to claim 10, further comprising:
- a coarse filtering means, for preventing the clogging of the filter packing in said container by dust and solid components in said pool, connected to said supply conduit, the coarse filtering means comprising a casing provided with an inlet and an outlet communicated with said supply conduit, a removable cover, a tubular body removably inserted into said casing, which body includes a filter material therein and is provided with apertures on its wall, whereby the water contaminated with oil flows into the tubular body through several of the apertures thereof, passes through the filter material and flows out of the tubular body through other of the apertures thereof.

12. An apparatus according to claim 11, wherein said filter material is of foamed-plastic.

13. An apparatus for separating oil from water which is contaminated with the oil, comprising;
- a closed, first air-free container for separating the oil from the water by allowing the oil to float up and the water to sink down so as to form a separated oil layer and an underlying layer which includes a purified water layer, which container comprises a filter packing disposed therein and spaced from the top thereof so as to form inside the container a top space for liquid;
- means for effecting the pressure of the liquid phases in said container to a value from approximately 0.05 kg/cm² to approximately 0.5 kg/cm² including:
- a first pump means for continuously pumping out said water contaminated with oil from a pool to said first container through a supply conduit defined below the following control switch means;
- a control switch means for operating said first pump means in dependency on the level of the liquid in said pool;
- a supply conduit entering said pool and connected to said first container and said first pump means;
- a second pump means for sucking said separated oil through an oil drain conduit defined below this pump means, and reducing the pressure of the air-free liquid phases in said first container;
- an oil drain conduit connected to said first container, communicating with the separated oil in said container and connected to said second pump means;
- a float switch means in dependency on the level of the interface between the separated oil layer and the underlying layer and operating either said second pump means or third pump means defined below this switch means;
- a third pump means for sucking said purified water through a water drain conduit defined below the following second container and reducing the pressure of the air-free liquid phases in said first container;
- a closed second container for separating the oil from the purified water in said first container by floating the oil upwards which second container comprises a filter packing which is disposed therein and is disposed from the top there of so as to form inside the second container a top space for liquid;
- a first water drain conduit connected to said second container, communicating with the purified water therein, and connected with said third pump means and second container; and
- a second water drain conduit connected to second container, communicating with the separated water in said second container and being provided with shut off means.

14. An apparatus according to claim 13, further comprising:
- a coarse filtering means, for preventing the clogging of the filter packing in said first container by dust and solid components in said pool, connected to said supply conduit, the coarse filtering means comprising a casing provided with an inlet and an outlet communicated with said supply conduit, a removable cover, a tubular body removably inserted into said casing, which body includes a filter material therein and is provided with apertures on its wall, whereby the water contaminated with oil flows into the tubular body through several of the apertures thereof, passes through the filter material and flows out of the tubular body through other of the apertures thereof.

15. An apparatus according to claim 14, wherein said filter material is foamed-plastic.

16. An apparatus for separating oil from water which is contaminated with the oil, comprising:
- a closed container for separating the oil from the water by allowing the oil to float up and the water to sink down so as to form a separated oil layer and an underlying layer which includes a purified water layer, which container comprises a filter packing disposed therein and spaced from the top thereof so as to form inside the container a top space for liquid, a partition plate essentially consisting of both a flat region and another region provided with apertures and inclined from the former region in such a manner that the tangential planes of the inclined region intersect an imaginary extended plane of the flat region at angles from 70 to 90°, which partition plate is secured at the end of the flat region on the inner wall of the container above a supply conduit defined below the following first pump means in such a manner that the inclined region extends upwardly;
- a first pump means for pumping out said water contaminated with oil from a pool thereof to said container through a supply conduit defined below this pump means;
- a supply conduit entering said pool and connected to said container and said first pump means;
- a control switch means for operating said first pump means in depency on the level of the liquid in said pool;
- a water drain conduit connected to said container, communicating with the purified water and provided with a shut off means;
- a second pump means for sucking said separated oil through an oil drain conduit defined below this pump means and reducing the pressure of the liquid phases in said container;
- an oil drain conduit connected to said container, communicating with the separated oil in said container and connected to said second pump means, and;
- a float switch means including a float in dependency on the level of the interface between the separated oil layer and the underlying layer, which float is located in the space defined by the upper surface of said partition plate and the inner wall of said container, and either operates said second pump means or opens the shut off means of water drain conduit.

17. An apparatus according to claim 16, wherein said partition plate is provided at its flat region with one or more conduits communicating with the spaces under and over the partition plate.

18. An apparatus for separating oil from water which is contaminated with the oil, comprising:
- a first closed container for separating the oil from the water by allowing the oil to float up and the water to sink down so as to form a separated oil layer and an underlying layer which includes a purified layer, which container comprises a filter packing disposed therein and spaced from the top thereof so as to form inside the container a top space for liquid, and a partition plate essentially consisting of both a flat region and another region provided with apertures and inclined from the former region in such a manner that the tangential planes of the inclined region intersect an imaginary extended plane of the flat region at angles from 70 to 90°, which partition plate is secured at the end of the flat region on the inner wall of the container above the supply conduit defined below the following first pump means in such a manner that the inclined region extends upwardly;
- a first pump means for pumping out said water contaminated with oil from a pool to said first container;
- a supply conduit entering said pool, and connected to said first container and said first pump means;

a second pump means for sucking said separated oil through an oil drain conduit defined below this pump means and reducing the pressure of the liquid phases in said first container;

an oil drain conduit connected to said first container, communicating with the separated oil in said first container and connected to said second pump means;

a third pump means for sucking said purified water through a water drain conduit defined below this pump means and reducing the pressure of the liquid phases in said first container;

a first water drain conduit connected to said first container, communicating with the purified water and connected to said third pump means, and;

a float switch means including a float in dependency on the level of the interface between separated oil layer and the underlying layer, which float is located in the space defined by the upper surface of said partition plate and the inner wall of said first container, and operates either said second pump means or said third pump means;

a closed, second container for separating the oil from the water purified in said first container by floating the oil, which second container comprise a filter packing which is disposed therein and is spaced from the top thereof so as to form inside the container a top space for liquid;

a second water drain conduit exiting from said first container and communicating with the purified water in the first container, and connected to said third pump means and said second container, and;

a second water drain conduit connected to said second container, communicating with the separated water in said second container and being provided with shut off means.

19. An apparatus according to claim 18, further comprising:

a control switch means for operating said first pump means in dependency on the level of the liquid in said pool.

20. An apparatus according to claim 18, wherein said partition plate is provided at its flat region with one or more conduits communicating with the spaces under and over the partition plate.

21. An apparatus according to claim 20, further comprising:

a control switch means for operating said first pump means in dependency on the level of the liquid in said pool.

22. An apparatus according to claim 18, further comprising:

a coarse filtering means, for preventing the clogging of the filter packing in said first container by dust and solid components in said pool, connected on said supply conduit, the coarse filtering means comprising a casing provided with an inlet and an outlet communicated with said supply conduit, a removable cover, a tubular body removably inserted into said casing including a filter material therein and provided with apertures on its wall, whereby the water contaminated with oil flows into the tubular body through several of the apertures thereof, passes through the filter material and flows out of the tubular body through other of the apertures thereof.

23. An apparatus according to claim 22, further comprising:

a control switch means for operating said first pump means in dependency on the level of the liquid in said pool.

24. An apparatus according to claim 22, wherein said partition plate is provided at its flat region with one or more conduits communicating with the spaces under and over the partition plate.

25. An apparatus according to claim 24, further comprising:

a control switch means for operating said first pump means in dependency on the level of the liquid in said pool.

* * * * *

UNITED STATES PATENT AND TRADEMARK OFFICE
CERTIFICATE OF CORRECTION

PATENT NO. : 4,088,578
DATED : May 9, 1978
INVENTOR(S) : Yoshioka et al

It is certified that error appears in the above-identified patent and that said Letters Patent are hereby corrected as shown below:

[30] "50-441[U]" should be -- 50-44171 --;

Col. 1, line 17, after "pumped" insert -- to --;

Col. 4, line 62, "course" should be -- coarse --;

Col. 6, line 21, delete "in" and substitute -- provided for --;

Col. 7, lines 19 & 20, "adsorbed" should be -- absorbed --;

Col. 8, line 11, after "half" insert -- of --;

Col. 9, line 1, "thereafore" should be -- therefore --;

Col. 10, line 37, "contaiminated" should be -- contaminated --;

Col. 13, line 33, "there of" should be -- thereof --;

Col. 14, line 20, "depency" should be -- dependency --.

Col. 13, line 33, "disposed" should be -- spaced --;

UNITED STATES PATENT AND TRADEMARK OFFICE
CERTIFICATE OF CORRECTION

PATENT NO. : 4,088,578
DATED : May 9, 1978
INVENTOR(S) : Teruo Yoshioka et al.

It is certified that error appears in the above-identified patent and that said Letters Patent are hereby corrected as shown below:

[22] "Aug. 4, 1976" should be --March 4, 1976--.

Signed and Sealed this

Twentieth Day of February 1979

[SEAL]

Attest:

RUTH C. MASON
*Attesting Officer*

DONALD W. BANNER
*Commissioner of Patents and Trademarks*